United States Patent
Lee et al.

(10) Patent No.: US 7,184,391 B2
(45) Date of Patent: Feb. 27, 2007

(54) OPTICAL RECORDING MEDIUM ON WHICH MULTI-MODULATED HEADER SIGNALS ARE RECORDED, APPARATUS AND METHOD OF RECORDING HEADER SIGNALS AND APPARATUS AND METHOD OF REPRODUCING HEADER SIGNALS

(75) Inventors: Kyung-geun Lee, Gyeonggi-do (KR); In-sik Park, Gyeonggi-do (KR); Byoung-ho Choi, Gyeonggi-do (KR); Jae-seong Shim, Seoul (KR); Du-seop Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 813 days.

(21) Appl. No.: 10/003,109

(22) Filed: Dec. 6, 2001

(65) Prior Publication Data

US 2003/0048725 A1     Mar. 13, 2003

(30) Foreign Application Priority Data

May 24, 2001   (KR) .............................. 2001-28688

(51) Int. Cl.
*G11B 7/24*       (2006.01)
*G11B 20/10*      (2006.01)

(52) U.S. Cl. .............................. 369/275.4; 369/47.19; 369/47.2; 369/124.04; 369/275.3

(58) Field of Classification Search ............. 369/44.13, 369/44.26, 47.1, 47.15, 47.21, 275.3, 275.4, 369/59.13, 59.25
See application file for complete search history.

(56) References Cited

U.S. PATENT DOCUMENTS

| | | | | |
|---|---|---|---|---|
| 5,170,385 A | * | 12/1992 | Senshu et al. ........... | 369/47.21 |
| 5,754,506 A | * | 5/1998 | Nagasawa et al. ....... | 369/44.26 |
| 5,933,410 A | * | 8/1999 | Nakane et al. ........... | 369/275.3 |
| 6,078,559 A | * | 6/2000 | Takemura et al. ....... | 369/275.3 |
| 6,097,684 A | * | 8/2000 | Oohata et al. ........... | 369/53.22 |
| 6,163,521 A | * | 12/2000 | Konishi et al. .......... | 369/275.3 |
| 6,167,012 A | * | 12/2000 | Van Den Enden et al. ......................... | 369/47.1 |
| 6,215,759 B1 | * | 4/2001 | Tanoue et al. ........... | 369/275.3 |
| 6,226,257 B1 | * | 5/2001 | Morimoto ................ | 369/275.4 |
| 6,233,219 B1 | * | 5/2001 | Hori et al. ............... | 369/275.4 |
| 6,252,845 B1 | * | 6/2001 | Hino et al. ............... | 369/275.3 |
| 6,282,163 B1 | * | 8/2001 | Fujiwara .................... | 369/59.2 |
| 6,320,831 B1 | * | 11/2001 | Inoue et al. ............. | 369/47.22 |
| 6,587,417 B2 | * | 7/2003 | Okamoto et al. ........ | 369/59.22 |
| 6,813,230 B1 | * | 11/2004 | Ko et al. .................. | 369/275.3 |
| 2002/0172122 A1 | * | 11/2002 | Choi et al. ............... | 369/59.25 |

FOREIGN PATENT DOCUMENTS

JP          2001-110061          4/2001

* cited by examiner

Primary Examiner—Thang V. Tran
(74) Attorney, Agent, or Firm—Stein, McEwen & Bui, LLP

(57) ABSTRACT

An optical recording medium on which a header signal having multi-modulated header information is recorded, an apparatus and method of recording the header signal, and an apparatus and method of reproducing header information from the header signal of the optical recording medium which includes a wobbled track on which user data is recorded, and a header area in which a header signal having multi-modulated header information is recorded. Accordingly, the optical recording medium increases the recording density of header information, thereby providing a wider user data area.

31 Claims, 8 Drawing Sheets

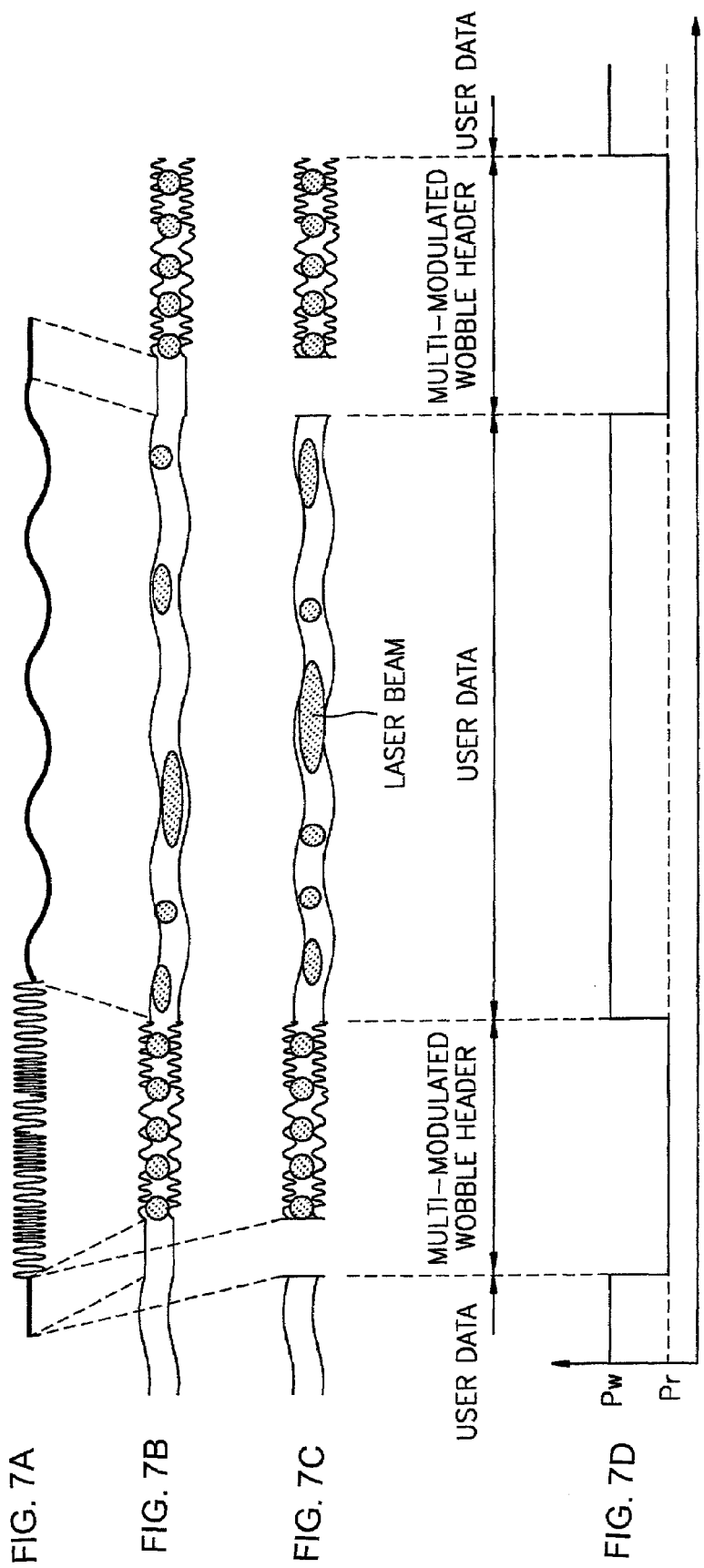

OPTICAL RECORDING MEDIUM ON WHICH MULTI-MODULATED HEADER SIGNALS ARE RECORDED, APPARATUS AND METHOD OF RECORDING HEADER SIGNALS AND APPARATUS AND METHOD OF REPRODUCING HEADER SIGNALS

CROSS-REFERENCE TO RELATED APPLICATIONS

This application claims the benefit of Korean Patent Application No. 2001-28688 filed on May 24, 2001, in the Korean Industrial Property Office, the disclosure of which is incorporated herein by reference.

BACKGROUND OF THE INVENTION

1. Field of the Invention

The present invention relates to optical recording and reproducing, and more particularly, to a wobbled track on which user data is recorded, an optical recording medium including a header area on which a header signal having header information is recorded, an apparatus and method of recording the header signal, and an apparatus and method of reproducing the header signal.

2. Description of the Related Art

An optical recording medium has a header area on which header information is recorded and a user data area on which user data is recorded. In a 2.6 GB or 4.7 GB DVD-RAM, 128 bytes of header information are recorded in the form of pre-pits in manufacturing a disk substrate. According to the DVD-RAM specification, the header area on which pre-pits are formed during the manufacturing of a disk substrate includes a variable frequency oscillator (VFO) region to provide a phase-locked loop (PLL), a physical identification data (PID) region to record addressing information, an ID error detection (IED) region to store ID error detection information, and a post amble (PA) region. The header area is provided at a predefined position on a sector, and a pick-up in a recording and/or reproducing apparatus locates a desired location through addressing information recorded in the header area. That is, the pick-up recognizes information such as a sector number, a sector type, land/groove track, and servocontrol information recorded in the header area.

As the use of multimedia quickly has grown in popularity and with the advent of digital broadcasting, it is highly desirable to have an optical recording medium which can store much more data than conventional optical recording mediums.

FIG. 1 is a schematic diagram of a conventional optical disk. Referring to FIG. 1, an optical disk includes land and groove tracks, which are a user data area to record user data. Variations in an amplitude direction are used to record a wobble signal having a specific frequency on the groove and/or land tracks. The wobble signal is used as an auxiliary clock signal to obtain synchronization information while recording and reproducing data. Hence, the wobble signal has a frequency band that has no impact upon a tracking servo-mechanism provided in a recording and/or reproducing apparatus. Header information is recorded on a header area 3 in the form of pre-pits. The pre-pits are arranged in a staggered fashion so that they are between adjacent sectors.

Since the header information is recorded by pre-pits, unlike the wobble signal, a signal detected from the header area 3 has quite different characteristics from those of the wobble signal. Thus, the header area 3 causes problems in extracting a clock signal from the wobble signal. Furthermore, it is difficult to exactly detect a boundary between the wobbled track on which the wobble signal is recorded and the header area 3, thereby degrading reliability of detected header information.

SUMMARY OF THE INVENTION

Accordingly, it is an object of the present invention to provide an optical recording medium on which a header signal capable of making more reliable header information to be detected is recorded, an apparatus and method of recording the header signal, and an apparatus and method of reproducing the header signal.

It is another object of the present invention to provide an optical recording medium on which a header signal having a greater amount of header information is recorded, an apparatus and method of recording the header signal, and an apparatus and method of reproducing the header signal.

Additional objects and advantages of the invention will be set forth in part in the description which follows and, in part, will be obvious from the description, or may be learned by practice of the invention.

The foregoing and other objects of the present invention are achieved by providing an optical recording medium comprising: a wobbled track on which user data is recorded; and a header area in which a header signal having multi-modulated header information is recorded.

The foregoing and other objects of the present invention may also be achieved by providing an optical recording medium wherein first and second header information modulated according to a first type and a second type of modulation, respectively, overlap each other in at least some of the intervals of the header signal, where the first type of modulation is one of phase modulation, frequency modulation, and amplitude modulation, and the second type of modulation is one of the remaining two types of modulation not provided by the first type of modulation.

The foregoing and other objects of the present invention may also be achieved by providing that the first through third header information, modulated according to first through third types of modulation, overlap one another in at least some of the intervals of the header signal, where the first type of modulation is one of phase modulation, frequency modulation, and amplitude modulation, the second type of modulation is one of the remaining two types of modulation not provided by the first type of modulation, and the third type of modulation is the last type of modulation not provided in the first and second type of modulation.

In one aspect of the present invention, not to be limited thereto, first through N-th header information are modulated according to first through N-th types of modulation, respectively, which overlap one another in at least some of the intervals of the header signal, where the first through N-th types of modulation are different from one another.

In another aspect of the present invention, not to be limited thereto, the header area further comprises a header flag region on which a flag signal indicative of a beginning of the header area is recorded between adjacent wobbled tracks. According to a further aspect of the invention, a direct current signal is recorded on the header flag region, or alternatively, the header flag region is formed as a mirror region.

According to yet another aspect of the invention, the wobble signal has a single frequency, and the header signal has a frequency higher than that of the wobble signal.

The foregoing and other objects of the present invention may also be achieved by providing a method of recording header information in the header area on an optical recording medium on which a wobble signal is recorded such that the method comprises the operations of: generating a header signal having multi-modulated header information; and recording the generated header signal.

In the generating of the header signal, the header signal is generated wherein at least some of the intervals where first and second header information are modulated according to first and second types of modulation, respectively, and overlap each other.

In one aspect of the invention, the first type of modulation is one of phase modulation, frequency modulation, and amplitude modulation, and the second type of modulation is one of the remaining two types of modulation not provided in the first type of modulation.

Alternatively, in the generating the header signal, the header signal is generated wherein at least some of the intervals where first through third header information are modulated according to first through third types of modulation, respectively, and overlap one another.

According to an aspect of the invention, the generating the header signal comprises modulating the first header information according to a first type of modulation; modulating the second header information according to a second type of modulation; modulating the third header information according to a third type of modulation; and overlapping the signals obtained in the three modulating operations.

According to an aspect of the invention, the first type of modulation is one of phase modulation, frequency modulation, and amplitude modulation, the second type of modulation is one of the remaining two types of modulation not provided in the first type of modulation, and the third type of modulation is the last type of modulation not provided in the first and second type of modulation.

The foregoing and other objects of the present invention may also be achieved by providing an apparatus recording a header signal in a header area on an optical recording medium on which a wobble signal is recorded, the apparatus comprising: a multi-modulator to multi-modulate header information and to generate the header signal; and a recording unit to record the generated header signal.

In one aspect of the present invention, not to be limited thereto, the multi-modulator comprises a first modulator to modulate the first header information according to a first type of modulation, a second modulator to modulate the second header information according to a second type of modulation, and a signal synthesizer to overlap signals output from the first and second modulators in at least some of the intervals of the modulated header signal.

According to an aspect of the invention, the first type of modulation is one of phase modulation, frequency modulation, and amplitude modulation, and the second type of modulation is one of the remaining two types of modulation not provided in the first type of modulation.

According to an additional aspect of the invention, the multi-modulator includes a first modulator to modulate first header information according to a first type of modulation, a second modulator to modulate second header information according to a second type of modulation; a third modulator to modulate third header information according to a third type of modulation; and a signal synthesizer to overlap the signals output from the first through third modulators in at least some of the intervals of the modulated header signal.

According to another aspect of the invention, the first modulator performs one of phase modulation, frequency modulation, and amplitude modulation, the second modulator performs one of the remaining two types of modulation not provided in the first type of modulation, and the third modulator performs the last type modulation not provided in the first and second types of modulations.

The foregoing and other objects of the present invention may also be achieved by providing a method of reproducing header information from a header area on an optical recording medium on which a wobble signal is recorded, the method comprises reading a header signal having multi-modulated header information; demodulating at least some of the intervals of the read header signal according to a first type of demodulation to obtain first header information; demodulating the intervals of the read header signal according to a second type of demodulation to obtain second header information; and combining the demodulated first and second header information, respectively, to output the combined header information.

The foregoing and other objects of the present invention may also be achieved by providing a method comprising reading a header signal having multi-modulated header information; demodulating some of intervals of the read header signal according to a first type of demodulation to obtain first header information; demodulating the intervals according to a second type of demodulation to obtain second header information; demodulating the intervals according to a third type of demodulation to obtain third header information; and combining the demodulated first through third header information to output the combined header information.

The foregoing and other objects of the present invention may also be achieved by providing an apparatus to reproduce header information from a header area on an optical recording medium on which a wobble signal is recorded, the apparatus comprising: a reading unit to read a header signal having multi-modulated header information; a first demodulator to demodulate at least some of intervals of the read header signal according to a first type of demodulation and obtains first header information; a second demodulator to demodulate the intervals according to a second type of demodulation and to obtain second header information; and a header information synthesizer to combine the first and second header information and to output the combined header information.

BRIEF DESCRIPTION OF THE DRAWINGS

These and other objects and advantages of the present invention will become apparent and more readily appreciated from the following description of the embodiments, taken in conjunction with the accompanying drawings of which:

FIG. 7 is a reference diagram explaining a wobbled track and a header area according to an embodiment of the present invention;

DETAILED DESCRIPTION OF THE PREFERRED EMBODIMENTS

Figure 1:
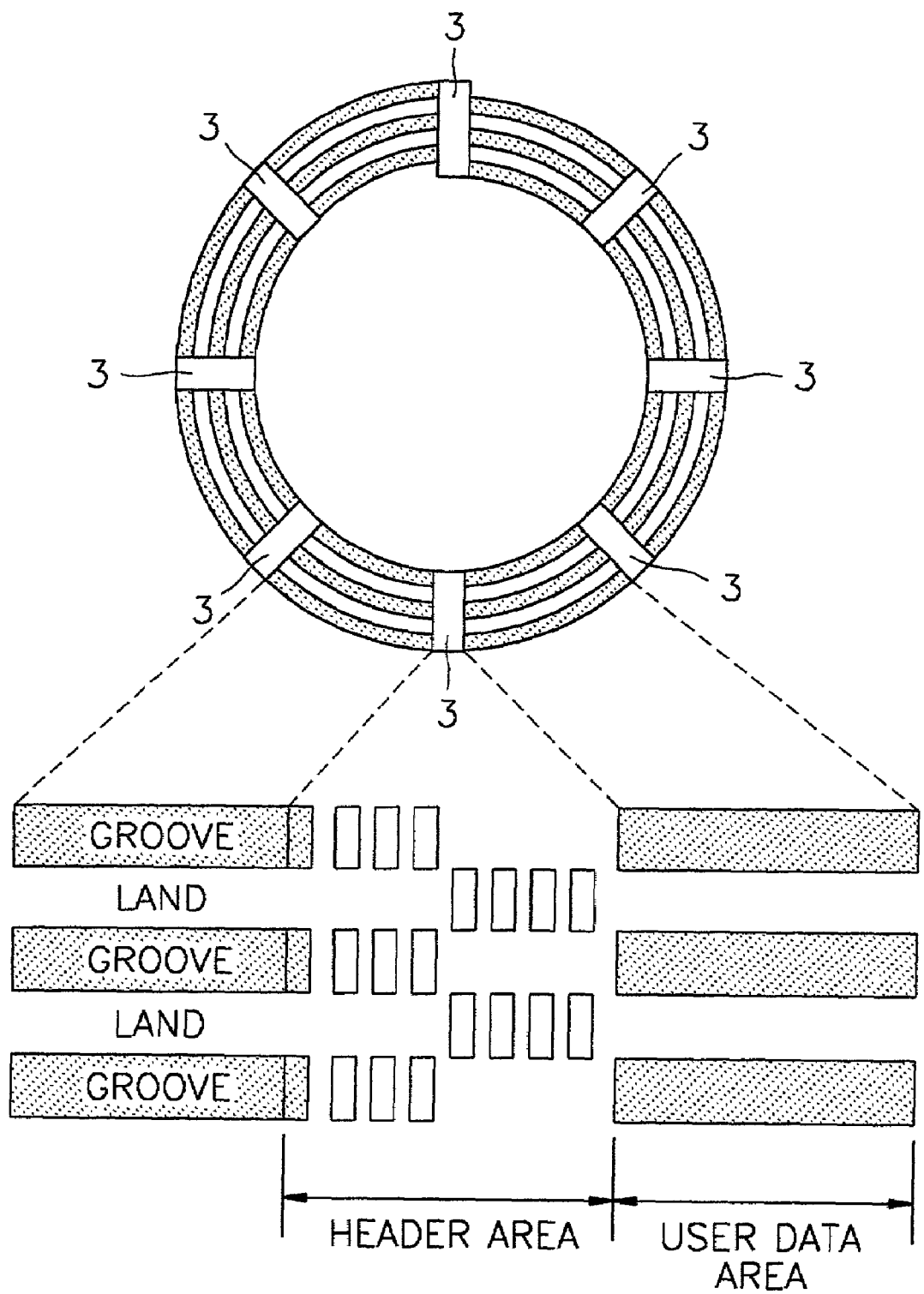
FIG. 1 is a schematic diagram of a conventional optical disk.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
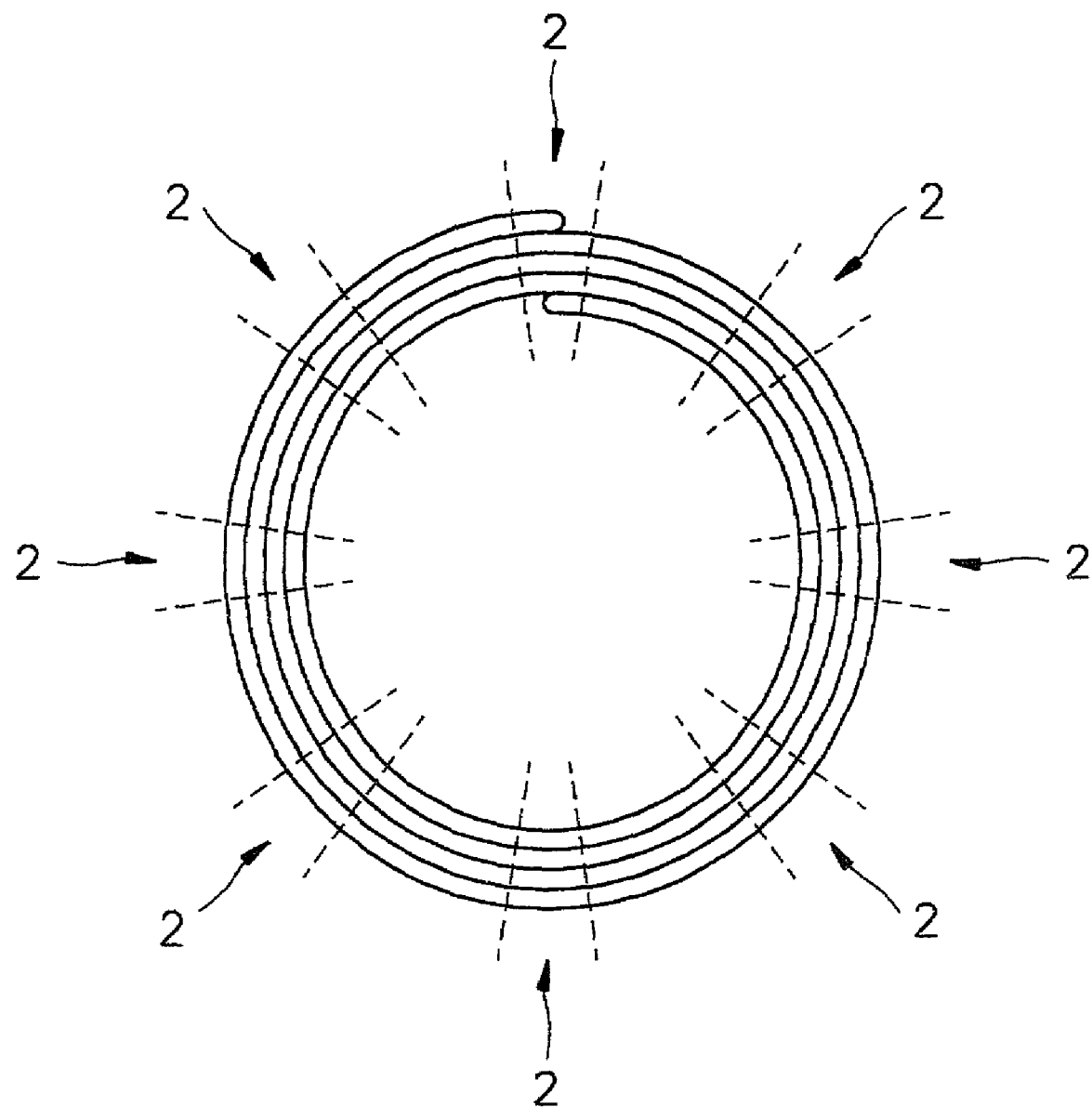
FIG. 2 is a schematic diagram of an optical disk according to an embodiment of the present invention.

Referring to FIG. 2, spiral wobbled tracks to record user data are formed on an optical disk. The wobbled tracks comprise groove tracks and land tracks. Also, while not shown, it is understood that the wobbled tracks may be formed as concentric circles. A wobble signal of a specific frequency is recorded on the wobbled track. A plurality of header areas 2 on which header information is recorded are positioned between adjacent wobbled tracks. In this way, the wobbled track and the header area 2 are positioned alternately.

Figure 3:
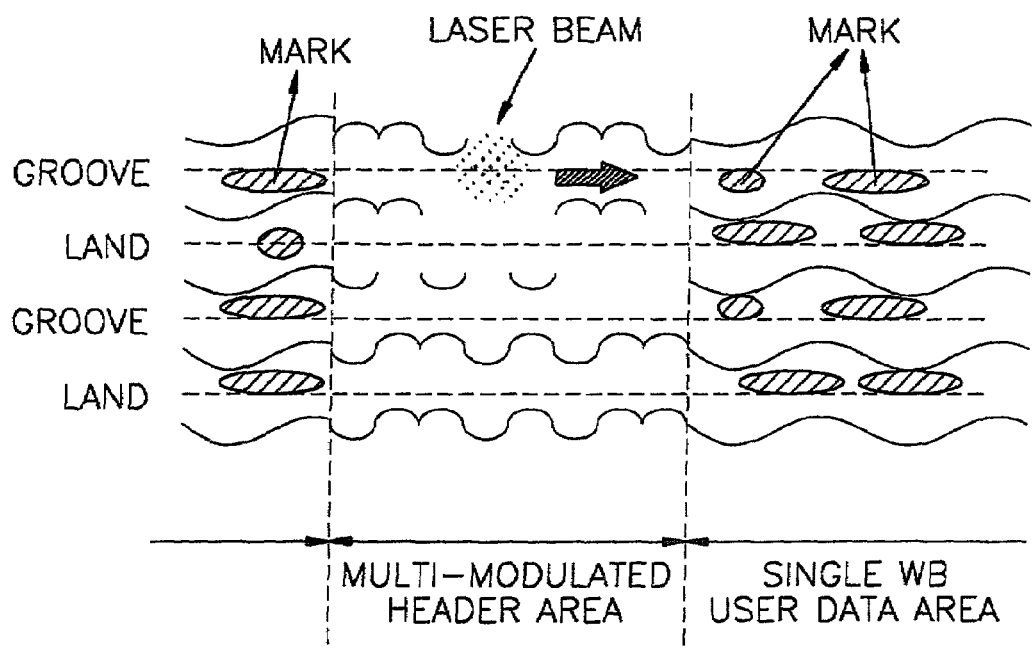
FIG. 3 is a reference diagram showing the wobbled track and the header area of FIG. 2.

Referring to FIG. 3, a single wobble signal having a single frequency is recorded on the groove and land tracks. A recording layer to overwrite, or record data only once, is applied on the groove and land tracks. If user data is recorded, a mark is formed on the recording layer. Tracks are continuously formed on the header area 2 so that they correspond to the groove and land tracks of the user data area. A header signal having header information is recorded on the tracks formed on the header area 2. The header information contains addressing information. Since the header signal contains various kinds of header information, it has a frequency higher than that of the wobble signal recorded on the wobbled tracks. The header signal will be described below in detail.

The tracks are formed on the header area 2 as they are in the user data area. Thus, the geometry of the optical recording medium according to the present invention is more uniform than that of a conventional optical recording medium having a header area on which pre-pits are recorded. The amount of a laser beam reflected becomes more uniform in recording data on an optical disk having a dual-layered structure as well as on that having a single-layered structure. Thus, header information can be reproduced using less power than is required to reproduce the header information recorded by pre-pits.

Figure 4:
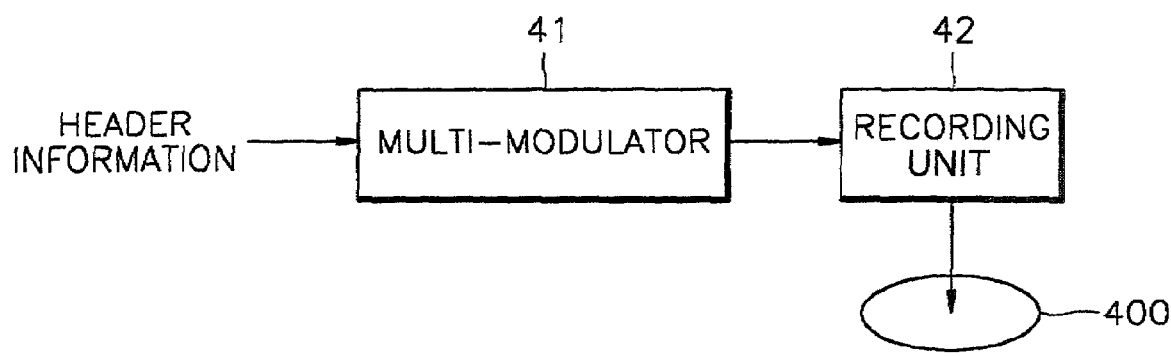
FIG. 4 is a block diagram of an apparatus to record a header signal according to an embodiment of the present invention.

FIG. 4 is a block diagram of an apparatus to record the header signal according to an embodiment of the present invention. Referring to FIG. 4, the header signal recording apparatus comprises a multi-modulator 41 and a recording portion 42. The multi-modulator 41 receives the header information to generate the header signal having multi-modulated header information. The recording portion 42 records the header signal generated by the multi-modulator 41 on an optical disk 400.

Figure 5A:
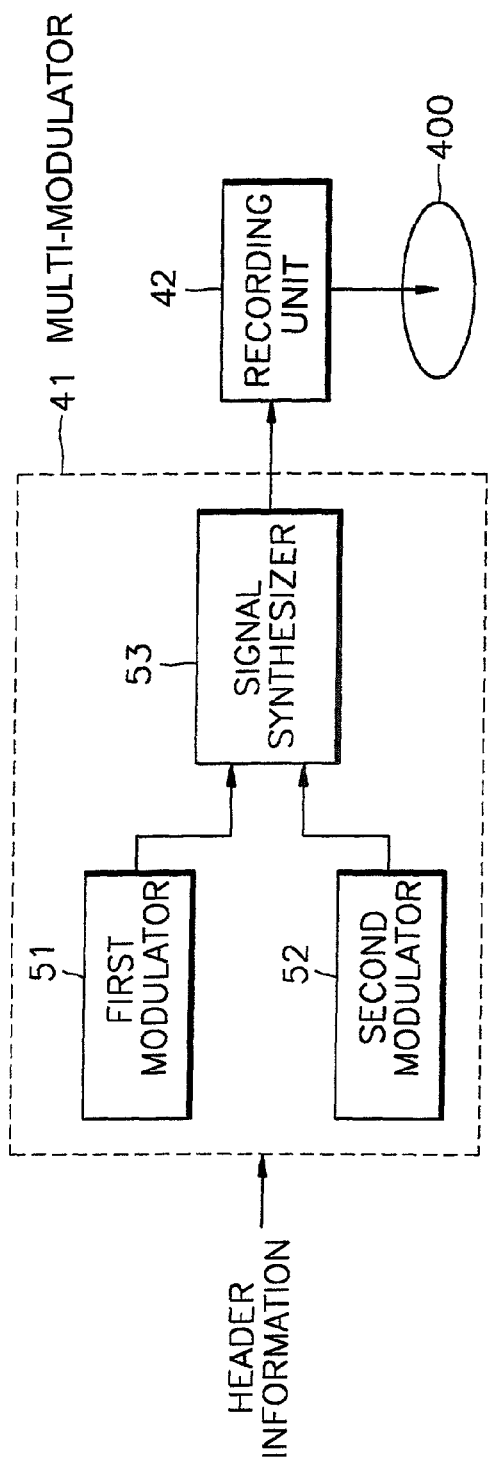
FIGS. 5A and 5B are implementation examples of the apparatus of FIG. 4.
Figure 5B:
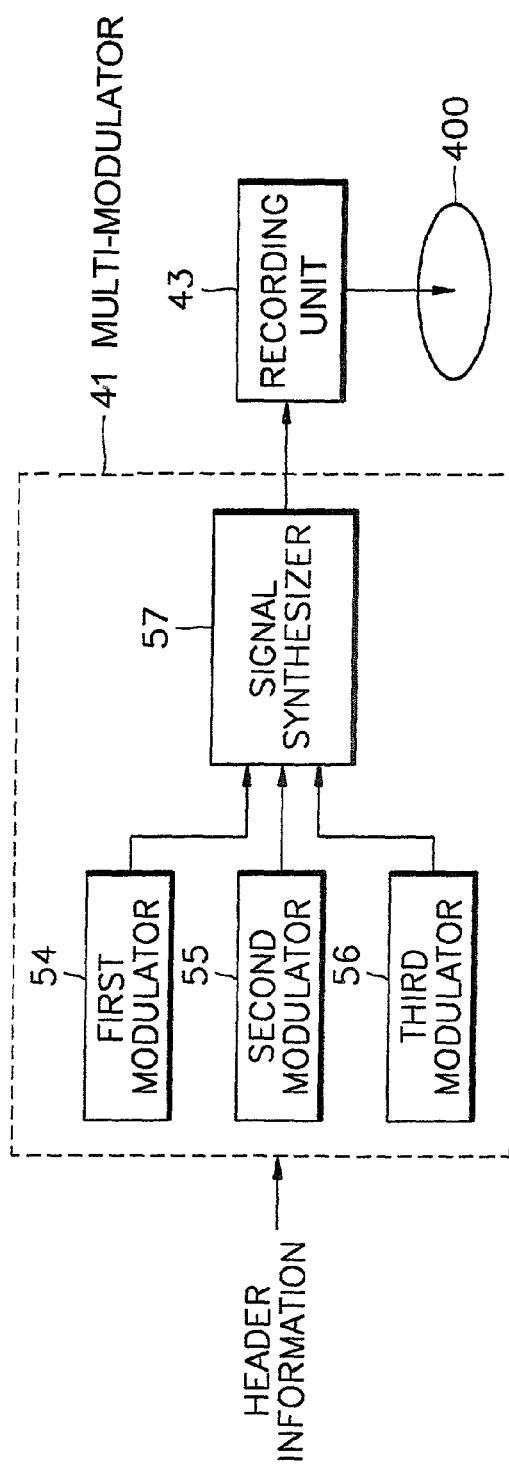

FIGS. 5A and 5B are embodiments of the multi-modulator 41 of FIG. 4. Referring to FIG. 5A, the multi-modulator 41 comprises a first modulator 51, a second modulator 52, and a signal synthesizer 53. The first modulator 51 modulates first header information according to a first type of modulation. The second modulator 52 modulates second header information according to a second type of modulation. The first modulator 51 performs one of phase modulation, frequency modulation, and amplitude modulation, while the second modulator 52 performs one of the two remaining types of modulation not provided in the first type of modulation. Alternatively, it is understood that the first and second modulators 51 and 52 may perform modulation other than the above three modulation techniques depending on the type of application. The signal synthesizer 53 overlaps the signals output from the first and second modulators 51 and 52 in at least some of the intervals to generate the header signal. As shown, the combined first and second header information makes up the header information. The first and second header information may be different from each other, or alternatively, at least some of the first and second header information may be identical with respect to one another.

Referring to FIG. 5B, the multi-modulator 41 comprises a first modulator 54, a second modulator 55, a third modulator 56, and a signal synthesizer 57. The first modulator 54 modulates first header information according to a first type of modulation, the second modulator 55 modulates second header information according to a second type of modulation and the third modulator 56 modulates third header information according to a third type of modulation. The first modulator 54 performs one of phase modulation, frequency modulation, and amplitude modulation, the second modulator 55 performs one of the two remaining types of modulation not provided in the first type of modulation, and the third modulator 56 performs the last type of modulation not provided in the first two types of modulation. Alternatively, the first through third modulators 54, 55, and 56 may perform modulation techniques other than the above three modulation techniques depending on the type of application. The signal synthesizer 57 overlaps the signals output from the first through third modulators 54, 55, and 56 in at least some of the intervals to generate the combined header signal. Here, the first through third header information makes up the entire header information. The first through third header information may be different from one another, or alternatively, at least some of the first through third header information may be identical with respect to one another.

Figures 6A, 6B:
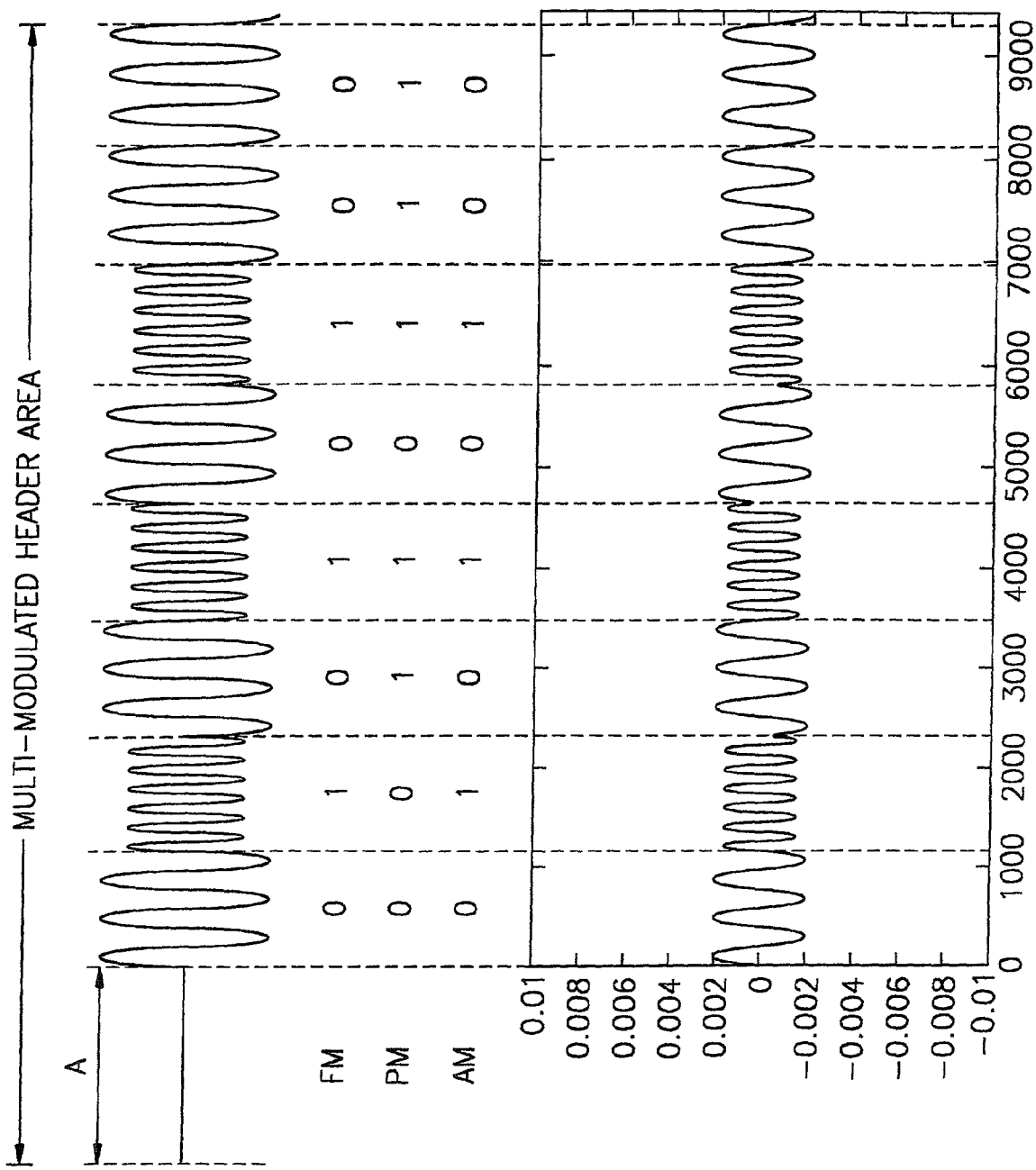
FIG. 6 is a reference diagram explaining a header signal generated by the multi-modulator of the apparatus of FIG. 4.

FIG. FIGS. 6A and 6B are reference diagrams explaining a header signal generated by the multi-modulator 41 of the header signal recording apparatus according to an embodiment of the present invention. Referring to FIG. 6A, if header information contains binary data, for example, "010101000011011101010100," and it is divided into three parts to provide first, second, and third header information, the first header information is frequency-modulated, the second header information is phase-modulated, and the third header information is amplitude-modulated. The frequency of a carrier signal used in the frequency modulation, phase modulation, or amplitude modulation is determined as a multiple of the frequency of a single frequency wobble signal, thereby making extraction of an auxiliary clock signal in the header area 2 (see FIG. 2) efficient. FIG. 6A is an illustration of a header signal having the first through third header information modulated according to the above described types of modulation. Here, A denotes a header flag region. The header flag region A serves as a flag indicative of the beginning or end of the header area 2. To this end, a dc signal is recorded on the header flag region A, or alternatively, the header flag region A is formed as a mirror region in which no signal is recorded. If the dc signal is recorded, the amplitude of a channel 2 signal detected from the header flag region A is zero. If a laser diode partitioned into four sections A, B, C, and D is used to detect signals, channel 2 and channel 1 signals are (A+B)−(C+D) and (A+B)+(C+D), respectively. The wobble signal and the header signal are detected as the channel 2 signal.

FIG. 6B is an illustration of a header signal obtained as a result of simulation using a wavelength of 400 nm, a numerical aperture (NA) of 0.85, a wobble signal period of 32 channel bits, a wobble signal amplitude of ±10 nm, and track pitch of 0.32 μm. In this way, the header signal according to the present invention has the duplicate or triplicate header information at the same region, thereby allowing for a double or triple recording density.

FIGS. 7A–7D illustrate a reference diagram of a wobbled track and a header area according to the present invention. FIG. 7A is a channel 2 signal detected from the wobbled track and the header area formed according to an embodiment of the present invention, and FIGS. 7B and 7C show a header area on which a header signal is recorded and a wobbled track on which a single frequency wobble signal is recorded according to another embodiment of the present invention. The header area of FIG. 7B has a header flag region on which a dc signal is recorded, while the header area of FIG. 7C has a header flag region formed as a mirror region. The amplitude of the channel 2 signals detected from the header flag region on which a dc signal is recorded and that formed as a mirror region is zero. FIG. 7D is a write power Pw used in writing user data to the wobbled track. As shown in FIG. 7D, the user data is recorded with the write power Pw, while a header signal is detected with a reproduce power Pr that is lower than the write power Pw. The reproduce power Pr is sufficiently high to detect the header signal recorded in the header area. Also, use of the reproduce power Pr, which is lower than the write power Pw, may prevent or delay degradation of the header signal compared to the use of the write power Pw.

Figure 8:
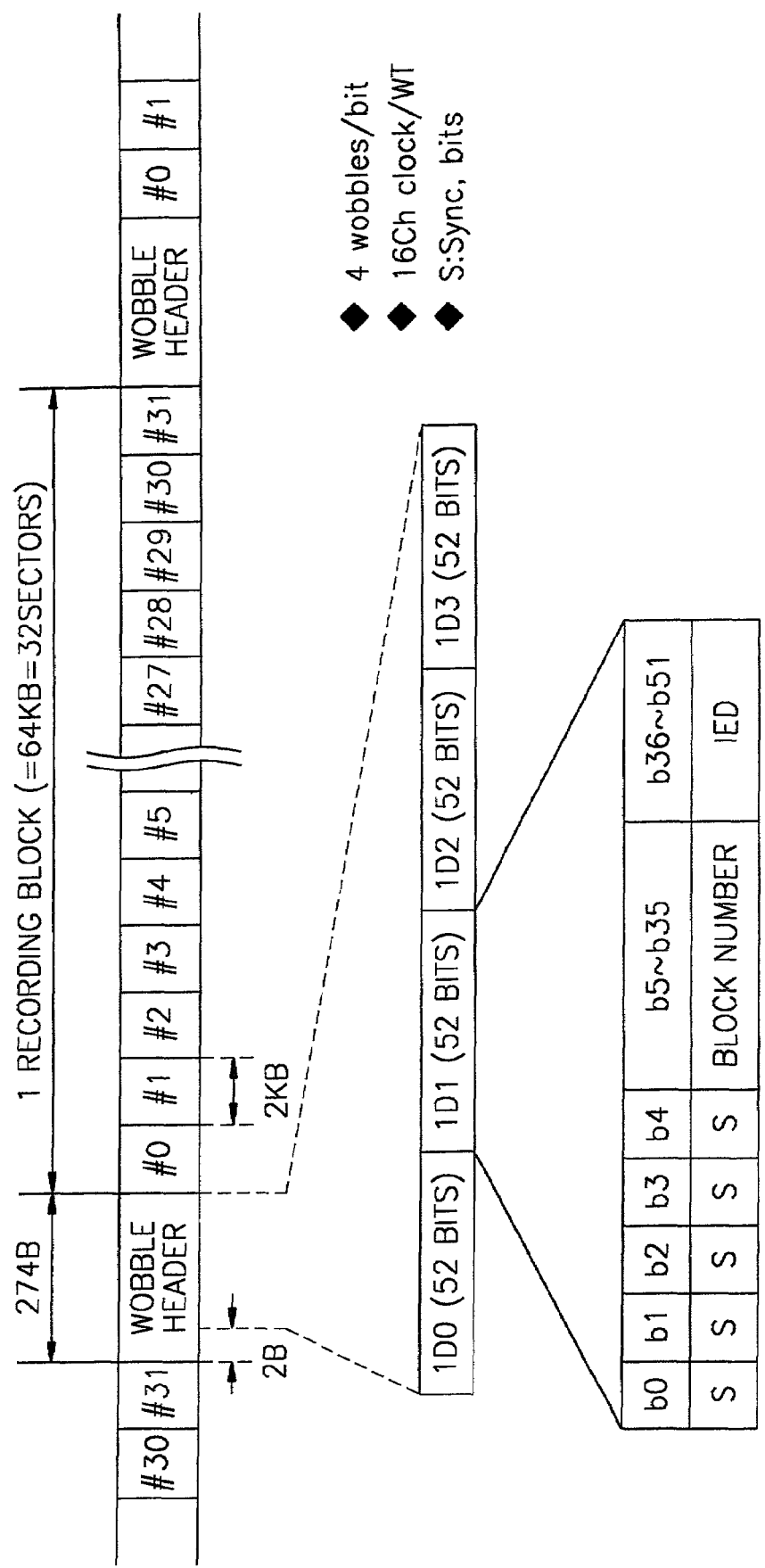
FIG. 8 is an example of the format of a wobbled track and a header area according to an embodiment of the present invention.

FIG. 8 is an example of the format of the wobbled track and the header area according to an embodiment of the present invention. Referring to FIG. 8, if a recording block has 32 sectors or 64 KB when 2 KB is assigned per sector, 64 KB of a recording block corresponds to 274 bytes of header area. The first 2 bytes are allocated for a header flag region, and the remaining 272 bytes are divided to allocate 52 bits for each of first through fourth header information ID0, ID1, ID2, and ID3. Each of the first through fourth header information ID0, ID1, ID2, and ID3 is recorded four times. Each of the header information ID0, ID1, ID2, and ID3 has 5 bits (b0–b4) of sync data, 31 bits (b5–b35) of block number (addressing information), and 16 bits (b36–b51) of ID error detection (IED) data. In this case, one bit is represented by four periods of a header signal, and the period WT of the header signal corresponds to 16 channel clocks. Since 1 error correction code (ECC) block has 16 sectors in the conventional DVD-RAM specifications, each recording block consists of two ECC blocks if data is allocated as shown in FIG. 8.

Figure 9:
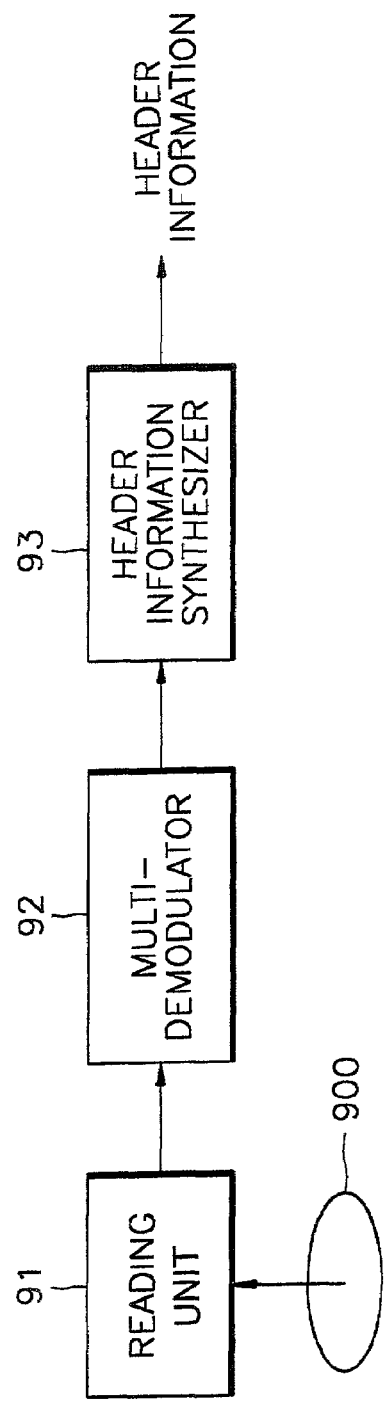
FIG. 9 is a block diagram of a header information reproducing apparatus according to an embodiment of the present invention.

FIG. 9 is a block diagram of a header information reproducing apparatus according to an embodiment of the present invention. Referring to FIG. 9, the apparatus to reproduce the header information from the header area on an optical recording medium 900 on which a wobble signal is recorded includes a reading unit 91, a multi-demodulator 92, and a header information synthesizer 93. The reading unit 91 reads the header signal having multi-modulated header information from the optical disk 900. The multi-demodulator 92 multi-demodulates the read header signal to get the header information. The header information synthesizer 93 combines the demodulated header information with each other to output the result as final header information.

Figure 10:
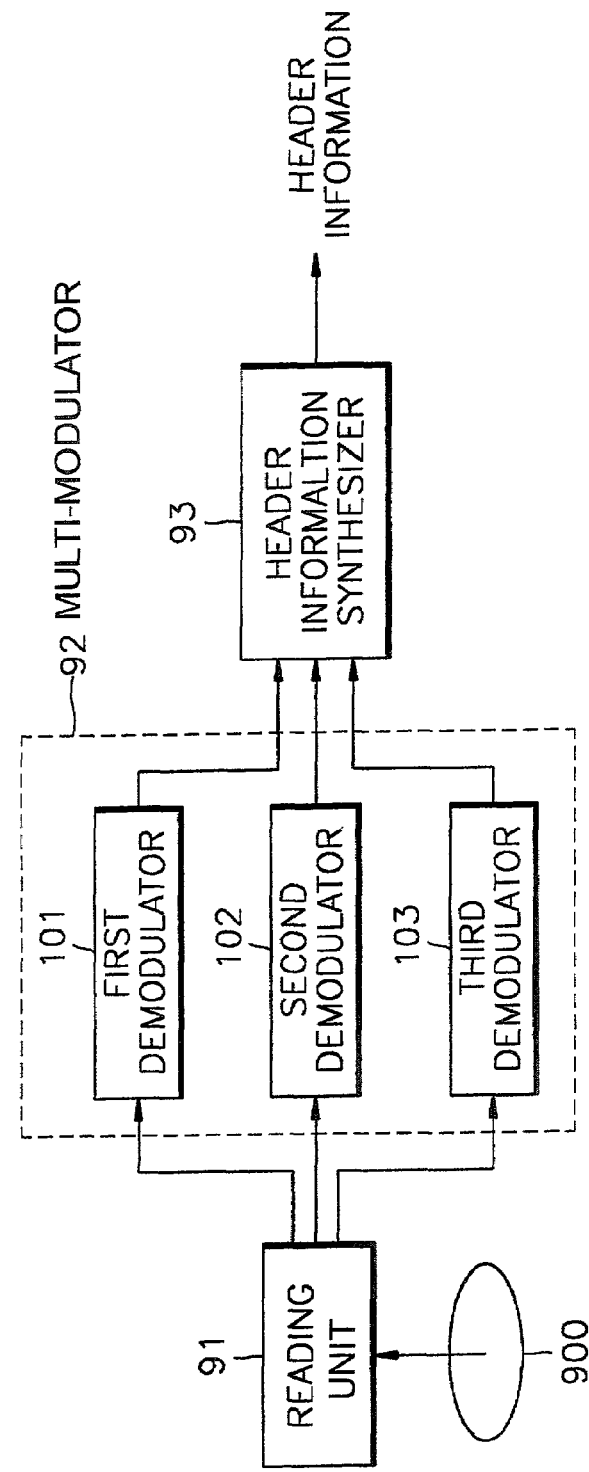
FIG. 10 is an implementation example of the apparatus of FIG. 9.

FIG. 10 is an example of an implementation of the apparatus of FIG. 9. Referring to FIG. 10, the multi-demodulator 92 includes first through third demodulators 101, 102, and 103. The first demodulator 101 demodulates a read header signal according to a first type of demodulation to obtain first header information. The second demodulator 102 demodulates the read header signal according to a second type of demodulation to obtain second header information. The third demodulator 103 demodulates the read header signal according to a third type of demodulation to obtain third header information. The header information synthesizer 93 combines the first through third header information to output a final combined header information. Here, the type of demodulation is determined depending on the type of modulation adopted in generating a header signal. For example, if frequency modulation, phase modulation, and amplitude modulation are sequentially used to generate a header signal, the first through third demodulators 101, 102, and 103 demodulate the read header signal based on the frequency, phase, and differential phase of the read header signal, respectively, to get the first through third header information of binary data. The header information synthesizer 93 combines the first through third header information to obtain final header information. For example, if the first through third header information is represented by "01010110", "00101100", and "00101100", respectively, the header information synthesizer 93 arranges and combines them successively to obtain the final header information represented by "010101000011011100101100".

To investigate recording and/or reproducing characteristics for a header area on which a header signal according to the present invention is recorded, an optical recording medium having only user data area is compared with that having a header area, on which the header signal according to the present invention is recorded, as well as a user data area, in terms of a minimum mark length (MML). As a MML decreases, the recording density of an optical recording medium increases. However, if the MML is too small, it is impossible to manufacture an optical recording medium. This is because there is a limit in reducing the intensity of a laser beam to record. The results in Tables 1 and 2 demonstrate that header information has a feasible MML even if a header signal according to the present invention is used to record header information having triple recording density.

To accomplish this, assuming that a 52-bit header information unit has 4 bits of sync data, 32 bits of addressing information (physical identification data (PID) information), and 16 bits of IED data, and that one sector corresponds to 38,688 channel bits, the period of a header signal is determined as shown in Table 1. Here, a channel bit refers to an actually recorded clock bit, which means a clock bit to record binary data obtained as a result of 8/16 modulation used in a conventional DVD.

TABLE 1

| Number of repetitions | 1 repetition | | | 2 repetitions | | | 3 repetitions | | | |
|---|---|---|---|---|---|---|---|---|---|---|
| Nr of periods/1 bit | TPID = 1 | TPID = 4 | TPID = 8 | TPID = 1 | TPID = 4 | TPID = 8 | TPID = 1 | TPID = 4 | TPID = 8 | TPID = 36 |
| Sector | 744 | 186 | 93 | 372 | 93 | 46 | 186 | 46 | 23 | |
| ECC block | 1 ECC block (32 KB) | 11904 | 2976 | 1488 | 5952 | 1488 | 736 | 2976 | 736 | 368 | |
| | 2 ECC block (64 KB) | — | — | — | — | — | 1488 | — | 1472 | 736 | 163 |

Here, TPID denotes the number of periods of a header signal required to represent 1 bit. As is evident from Table 1, as TPID increases, an error rate decreases, but the period becomes shorter. The data capacity required for a header area according to the present invention and the period of a header signal are calculated based on the computed values of Table 1, as shown in Table 2.

TABLE 2

| | | FM + PM + AM | | |
|---|---|---|---|---|
| TPID | Period of header signal (channel bit) | Capacity (bytes) | Overhead | MML (μm) |
| 1 | 32 | 137 | 0.21% | |
| | 16 | 69 | 0.11% | |
| 2 | 32 | 274 | 0.42% | |
| | 16 | 137 | 0.21% | |
| 4 | 32 | 541 | 0.84% | 0.184 |
| | 16 | 274 | 0.42% | 0.185 |
| 8 | 32 | 1082 | 1.68% | 0.182 |
| | 16 | 548 | 0.84% | |
| | | 0 | 0 | 0.186 |

Table 2 shows the result of a simulation of an MML obtained assuming that 64 KB is allocated per header area, and that a header information unit is recorded four times on the header area having a track pitch of 0.32 μm using groove recording while the user data region has a track pitch of 24–58 mm and 25 GB of recording capacity. That is, when a frequency-modulated signal, a phase-modulated signal, and an amplitude-modulated signal overlap one another according to the present invention to generate a header signal having three times the recording density of a single modulated signal, if the header signal has a period of 32 channel bits, an overhead and an MML for each recording block are 0.84% and 0.184 μm, respectively. If the header signal has a period of 16 channel bits, an overhead is 0.42% and an MML is 0.185 μm. The MML is 0.001 μm shorter than an MML of 0.186 μm obtained on the assumption that only user data area exists. In view of the simulation result, it is possible to implement MML through a current laser recording technique even if the header signal according to the present invention is used to record header information with double or triple recording density. That is, a header area on which a header signal according to the present invention is recorded has no problem in recording or reproducing data.

Although the present invention has been described with respect to generation of a double or triple modulated header signal by the multi-modulator 41, it is possible to generate a header signal modulated according to N types of modulation. If the N types of modulation are performed on a header signal, the multi-modulator 41 includes first through N-th modulators to perform different types of modulation and a signal synthesizer to combine signals output from the N modulators to overlap one another in at least some of the intervals. Thus, the multi-demodulator 92 of the header information reproducing apparatus includes first through N-th demodulators to perform different types of demodulation corresponding to the first through N-th modulators. The header information synthesizer 93 of the reproducing apparatus combines the header information output from the first through N-th demodulators.

As described above, according to the present invention, header information is recorded by a header signal in place of pre-pits, thereby detecting the channel 2 signal more stably and reproducing more reliable header information. Furthermore, the present invention enables a header signal to have a greater amount of header information, thereby reducing the area of a header area while providing a wider user data area.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical recording medium comprising:
   a wobbled track on which user data is recorded; and
   a header area in which first through N header information are recorded as a multi-modulated signal, wherein:
   the first through N header information modulated according to first through N types of modulation, respectively, overlap one another in at least some intervals of the multi-modulated signal.

2. The optical recording medium of claim 1, wherein N is 2.

3. The optical recording medium of claim 2, wherein the first type of modulation is one of phase modulation, frequency modulation, and amplitude modulation, and the second type of modulation is one of the remaining two types of modulation not provided in the first type of modulation.

4. The optical recording medium of claim 1, wherein N is 3.

5. The optical recording medium of claim 4, wherein the first type of modulation is one of phase modulation, frequency modulation, and amplitude modulation, the second type of modulation is one of the remaining two types of modulation not provided by the first type modulation, and the third type of modulation is the last type of modulation not provided by the first and second types of modulation.

6. The optical recording medium of claim 1, wherein the header area further comprises a header flag region including a flag signal to indicate a beginning of the header area positioned between adjacent wobbled tracks.

7. The optical recording medium of claim 6, wherein the flag signal comprises a direct current signal recorded in the header flag region.

8. The optical recording medium of claim 6, wherein the flag signal in the header flag region is a mirror region.

9. The optical recording medium of claim 1, wherein said wobble track is a wobble signal having a single frequency.

10. The optical recording medium of claim 9, wherein a header signal generated from the header area has a frequency which is higher than the single frequency of the wobble signal.

11. The optical recording medium of claim 1, wherein said wobbled track and said header area are positioned alternately.

12. The optical recording medium of claim 11, wherein said wobbled track comprises a user data area to record user data and includes land and groove tracks.

13. A method of recording header information in a header area on an optical recording medium on which a wobble signal is recorded, the method comprising:
  generating a multi-modulated header signal wherein first through N header information, recorded in the header area, modulated according to first through N types of modulation, respectively, overlap one another in at least some intervals of the multi-modulated header signal; and
  recording the generated header signal on the optical recording medium.

14. The method of claim 13, wherein N is 2.

15. The method of claim 14, wherein the first type of modulation is one of phase modulation, frequency modulation, and amplitude modulation, and the second type of modulation is one of the remaining two types of modulation not provided in the first type of modulation.

16. The method of claim 14, wherein N is 3.

17. The method of claim 16, wherein the first type of modulation is one of phase modulation, frequency modulation, and amplitude modulation, the second type of modulation is one of the remaining two types of modulation not provided in the first type of modulation, and the third type of modulation is the last type modulation not provided in the first and second types of modulation.

18. The method of claim 13, wherein the wobble signal has a single frequency.

19. The method of claim 18, wherein the header signal has a frequency higher than the single frequency of the wobble signal.

20. The method of claim 13, wherein the wobbled track and the header area are positioned alternately.

21. An apparatus to record a header signal in a header area on an optical recording medium on which a wobble signal is recorded, the apparatus comprising:
  a multi-modulator to generate a multi-modulated header signal wherein:
    first through N header information, recorded in the header area, modulated according to first through N types of modulation, respectively, overlap one another in at least some intervals of the multi-modulated header signal; and
  a recording unit to record the generated multi-modulated header signal.

22. The apparatus of claim 21, wherein N is 2.

23. The apparatus of claim 21, wherein N is 2 and said multi-modulator comprises:
  a first modulator to modulate the first header information according to the first type of modulation;
  a second modulator to modulate the second header information according to the second type of modulation; and
  a signal synthesizer to overlap signals output from the first and second modulators in the at least some intervals of the modulated header signals.

24. The apparatus of claim 23, wherein the first type of modulation is one of phase modulation, frequency modulation, and amplitude modulation, and the second type of modulation is one of the remaining two types of modulation not provided in the first type modulation.

25. The apparatus of claim 21, wherein N is 3 and the multi-modulator comprises:
  a first modulator to modulate the first header information according to the first type of modulation;
  a second modulator to modulate the second header information according to the second type of modulation;
  a third modulator to modulate the third header information according to the third type of modulation; and
  a signal synthesizer to overlap signals output from the first through third modulators in the at least some intervals of the modulated header signals.

26. The apparatus of claim 25, wherein each modulator performs a different one of phase modulation, frequency modulation, and amplitude modulation.

27. A method of reproducing header information from a header area on an optical recording medium on which a wobble signal is recorded, the method comprising:
  reading a multi-modulated header signal wherein first and second header information, recorded in the header area, modulated according to first and second types of modulation, respectively, overlap one another in at least some intervals of the multi-modulated header signal;
  demodulating the read header signal according to a first type of demodulation to obtain the first header information;
  demodulating the read header signal according to a second type of demodulation to obtain the second header information; and
  combining the demodulated first and second header information, to output combined header information.

28. A method of reproducing header information from a header area on an optical recording medium on which a wobble signal is recorded, the method comprising:
  reading a multi-modulated header signal wherein first, second and third header information, recorded in the header area, modulated according to first, second and third types of modulation, respectively, overlap one another in at least some intervals of the multi-modulated header signal;
  demodulating some of the intervals of the read header signal according to a first type of demodulation to obtain the first header information;
  demodulating the intervals according to a second type of demodulation to obtain the second header information;
  demodulating the intervals according to a third type of demodulation to obtain the third header information; and
  combining the demodulated first, second and third header information to output combined header information.

29. An apparatus to reproduce header information from a header area on an optical recording medium on which a wobble signal is recorded, the apparatus comprising:

a reading unit to read a multi-modulated header signal wherein first and second header information, recorded in the header area, modulated according to first and second types of modulation, respectively, overlap one another in at least some intervals of the multi-modulated header signal;

a first demodulator to demodulate at least some intervals of the read header signal according to a first type of demodulation and to obtain the first header information;

a second demodulator to demodulate the intervals according to a second type of demodulation and to obtain the second header information; and a header information synthesizer to combine the first and second header information and to output combined header information.

30. The apparatus of claim 29, further comprising a third demodulator demodulating the intervals according to a third type of demodulation to obtain third header information, wherein the header information synthesizer combines the third header information with the first and second header information.

31. An apparatus to record a header signal on and reproduce header information from a header area on an optical recording medium on which a wobble signal is recorded, the apparatus comprising:

a header signal recorder comprising:
   a multi-modulator to generate a multi-modulated header signal wherein first and second header information, recorded in the header area, modulated according to first and second types of modulation, respectively, overlap one another in at least some intervals of the multi-modulated header signal;
   a recording unit to record the generated multi-modulated header signal on the optical recording medium; and a header signal reproducer comprising:
   a reading unit to read the multi-modulated header signal from the recording medium;
   a first demodulator to demodulate at least some intervals of the read header signal according to a first type of demodulation and to obtain the first header information;
   a second demodulator to demodulate the intervals according to a second type of demodulation and to obtain the second header information; and a header information synthesizer to combine the first and second header information and to output the combined header information.

* * * * *

UNITED STATES PATENT AND TRADEMARK OFFICE
CERTIFICATE OF CORRECTION

| | | |
|---|---|---|
| PATENT NO. | : 7,184,391 B2 | Page 1 of 1 |
| APPLICATION NO. | : 10/003109 | |
| DATED | : February 27, 2007 | |
| INVENTOR(S) | : Kyung-geun Lee et al. | |

It is certified that error appears in the above-identified patent and that said Letters Patent is hereby corrected as shown below:

Column 11, line 35
        change "claim 14" to --claim 13--

Signed and Sealed this

Third Day of July, 2007

JON W. DUDAS
*Director of the United States Patent and Trademark Office*